United States Patent
Kuhlman

(10) Patent No.: US 9,315,182 B2
(45) Date of Patent: Apr. 19, 2016

(54) BRAKING SYSTEM

(71) Applicant: Robert Bosch GmbH, Stuttgart (DE)

(72) Inventor: Ryan A. Kuhlman, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/317,465

(22) Filed: Jun. 27, 2014

(65) Prior Publication Data

US 2015/0375728 A1    Dec. 31, 2015

(51) Int. Cl.
  *B60T 8/40*     (2006.01)
  *B60T 11/16*    (2006.01)
  *B60T 11/20*    (2006.01)
  *B60T 13/14*    (2006.01)

(52) U.S. Cl.
  CPC .............. *B60T 11/20* (2013.01); *B60T 13/147* (2013.01)

(58) Field of Classification Search
  CPC ............................ B60T 8/4013; B60T 13/586
  USPC .......... 303/116.2, 151, 152; 188/354; 60/562, 60/579
  See application file for complete search history.

(56) References Cited

U.S. PATENT DOCUMENTS

| 4,428,462 | A | * | 1/1984 | Warwick et al. | 188/72.4 |
|---|---|---|---|---|---|
| 4,585,281 | A | * | 4/1986 | Schnurer | 303/116.2 |
| 5,102,205 | A | * | 4/1992 | Stegmaier | 303/116.2 |
| 5,141,296 | A | * | 8/1992 | Arikawa | 303/116.1 |
| 5,213,399 | A | * | 5/1993 | Burgdorf et al. | 303/116.2 |
| 5,306,075 | A | * | 4/1994 | Matsuda et al. | 303/116.2 |
| 5,383,719 | A | | 1/1995 | Farr | |
| 6,276,137 | B1 | | 8/2001 | Kottmyer et al. | |
| 6,443,534 | B2 | | 9/2002 | Kamiya | |
| 2003/0234573 | A1 | | 12/2003 | Reuter et al. | |
| 2005/0151418 | A1 | | 7/2005 | Bickel et al. | |
| 2011/0120122 | A1 | | 5/2011 | Cagnac et al. | |
| 2013/0062932 | A1 | * | 3/2013 | Yagashira | 303/3 |
| 2013/0312404 | A1 | | 11/2013 | Ganzel et al. | |

FOREIGN PATENT DOCUMENTS

| DE | 19905660 | 5/2000 |
|---|---|---|
| EP | 2703238 | 3/2014 |

(Continued)

OTHER PUBLICATIONS

Extended European Search Report for Application No. 15168686.2 dated Nov. 3, 2015 (12 pages).

*Primary Examiner* — Thomas J Williams

(74) *Attorney, Agent, or Firm* — Michael Best & Friedrich LLP

(57) ABSTRACT

A vehicle braking system having a master cylinder and first and second hydraulic braking circuits including respective first and second wheel cylinders for braking first and second wheels. The master cylinder has first and second outlets, first and second pistons associated with the first and second outlets, a fluid reservoir and a master cylinder input member provided with a mechanical coupling to drive the first piston and configured to drive the second piston only through movement of hydraulic fluid. The second hydraulic braking circuit is selectively disengageable from the master cylinder via a separation valve. The second hydraulic braking circuit includes a line coupling a suction side of a pump with the master cylinder reservoir. A pressure control valve is configured to modulate the amount of fluid drawn from the reservoir by the pump. The second hydraulic braking circuit is coupled to the first outlet of the master cylinder.

13 Claims, 3 Drawing Sheets

(56) References Cited

FOREIGN PATENT DOCUMENTS

| WO | 94/25322 | 11/1994 |
| WO | 97/10133 | 3/1997 |
| WO | 01/60672 | 8/2001 |
| WO | 2010/102844 | 9/2010 |

* cited by examiner

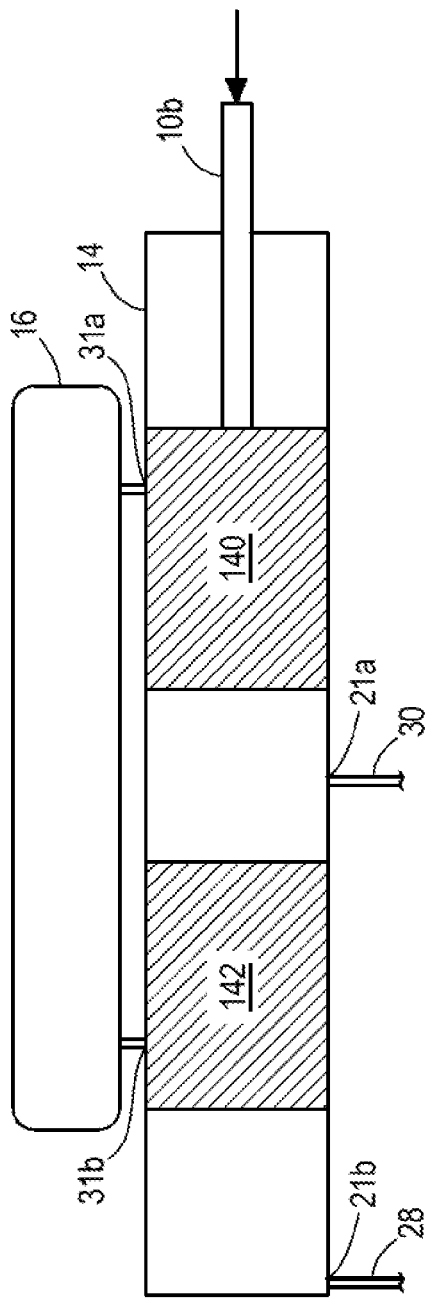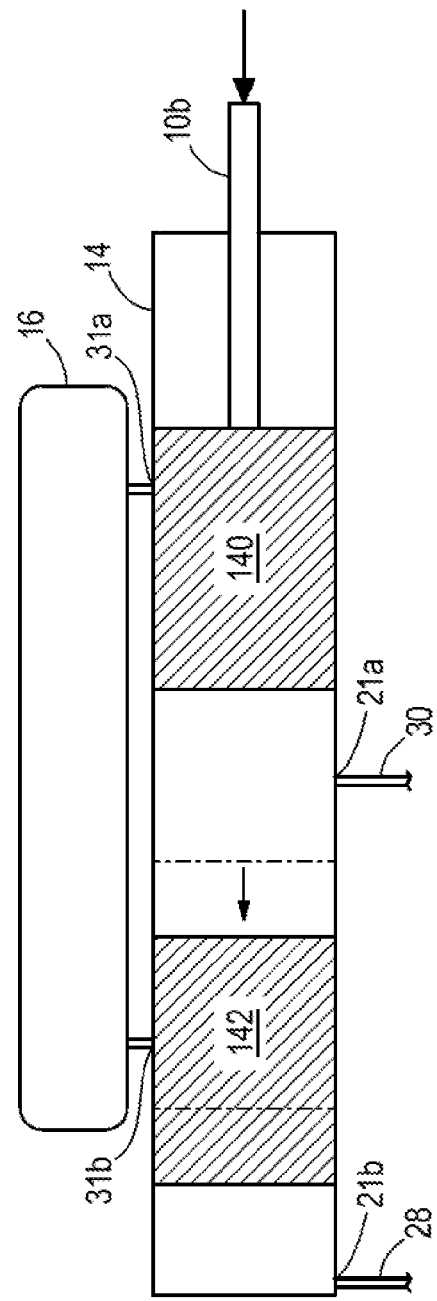

BRAKING SYSTEM

BACKGROUND

The present invention relates to vehicles and vehicle braking systems. More particularly, the invention relates to the hydraulic connection between braking circuits and a master cylinder.

SUMMARY

In one aspect, the invention provides a vehicle braking system having a first hydraulic braking circuit including a first hydraulic wheel cylinder operable to brake a first wheel, a second hydraulic braking circuit including a second hydraulic wheel cylinder operable to brake a second wheel, and a master cylinder. The master cylinder has first and second outlets, first and second pistons associated with the first and second outlets, a fluid reservoir and a master cylinder input member provided with a mechanical coupling to drive the first piston and configured to drive the second piston only through movement of hydraulic fluid. The second hydraulic braking circuit is selectively disengageable from the master cylinder via a separation valve. The second hydraulic braking circuit includes a line coupling a suction side of a pump with the master cylinder fluid reservoir. A pressure control valve is configured to modulate the amount of fluid drawn from the master cylinder fluid reservoir by the pump. The second hydraulic braking circuit is coupled to the first outlet of the master cylinder.

In another aspect, the invention provides a method of actuating brakes in a vehicle brake system. An input is provided for receiving a driver braking request. A master cylinder is provided having a primary chamber associated with a primary piston, a secondary chamber associated with a secondary, floating piston, and a brake fluid reservoir. A first hydraulic braking circuit is provided including a hydraulic wheel cylinder configured to brake a first wheel in response to actuation of the master cylinder. A second hydraulic braking circuit is provided including a hydraulic wheel cylinder configured to brake a second wheel in response to actuation of the master cylinder, the second hydraulic braking circuit having a pump coupled with the brake fluid reservoir. In state where the master cylinder is actuated by the input from the driver braking request, fluid is pumped with the pump of the second hydraulic braking circuit from the brake fluid reservoir into the primary chamber of the master cylinder.

Other aspects of the invention will become apparent by consideration of the detailed description and accompanying drawings.

BRIEF DESCRIPTION OF THE DRAWINGS

FIG. 3 is a schematic view of a master cylinder of the braking system according to FIG. 2 in a first actuated condition.

FIG. 4 is a schematic view of the master cylinder of FIG. 3 in a second actuated condition.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
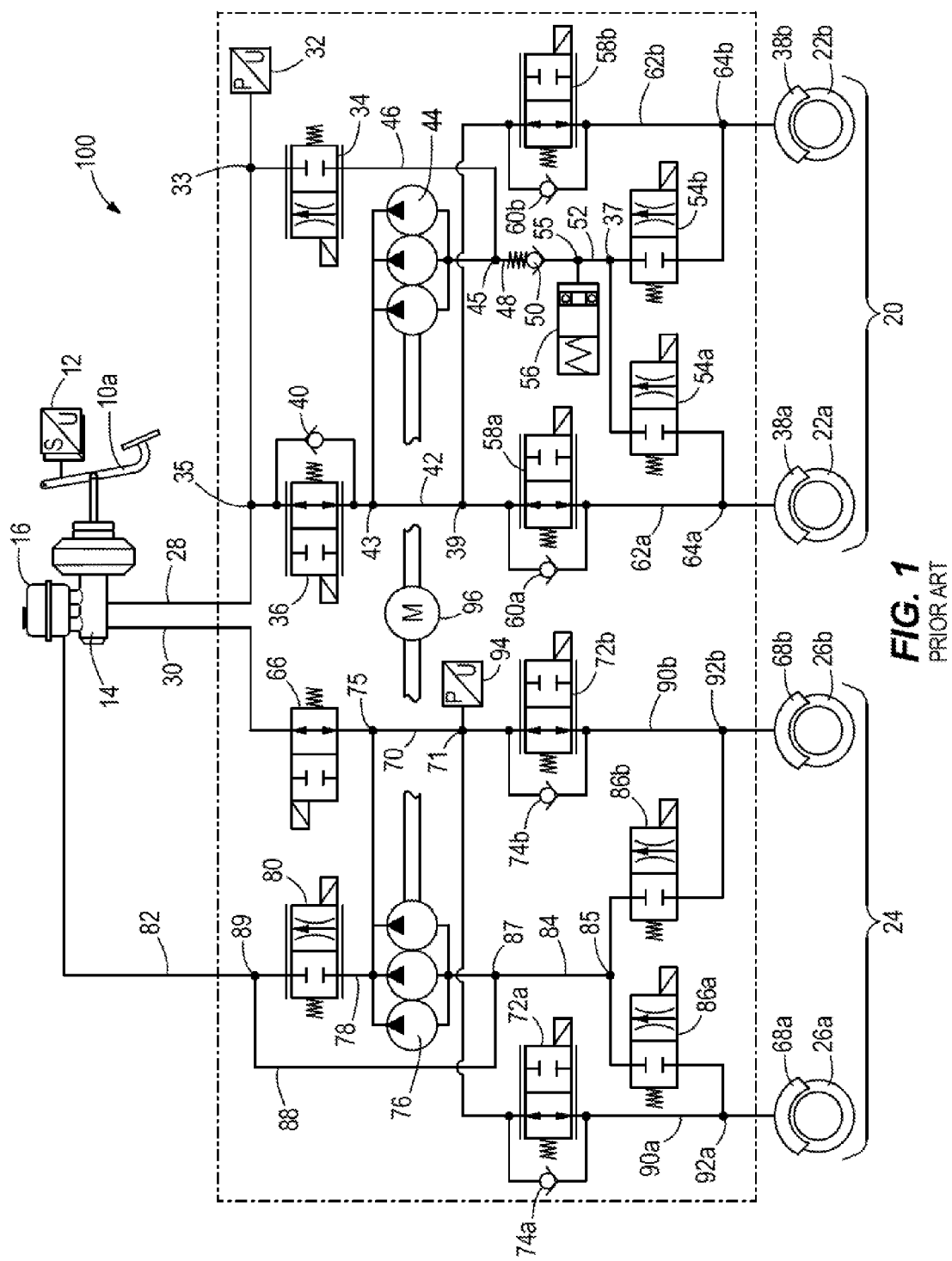
FIG. 1 is a schematic view of a hydraulic braking system according to the prior art.
Figure 2:
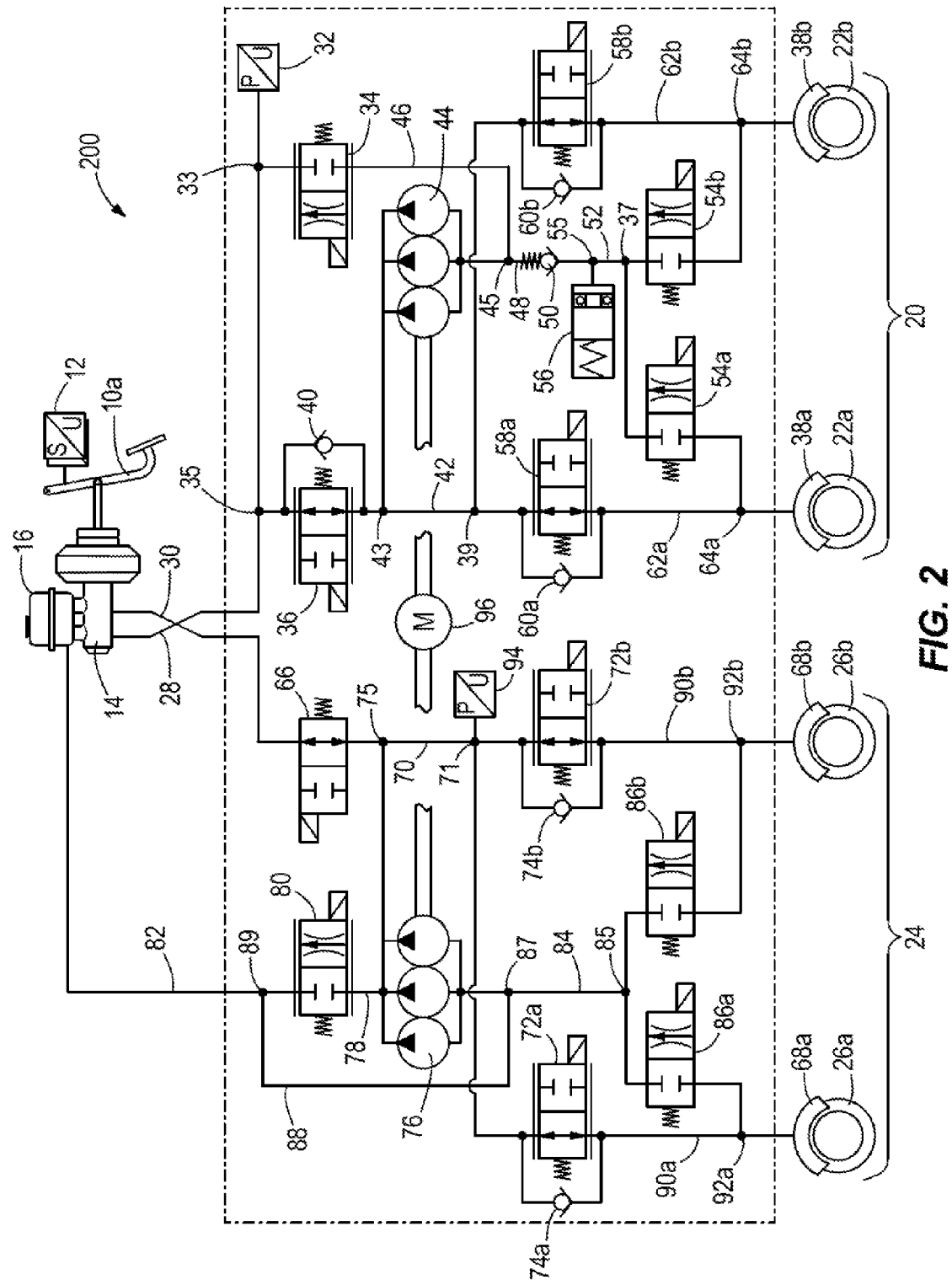
FIG. 2 is a schematic view of a hydraulic braking system according to an aspect of the invention.

A braking system 200 is illustrated in FIG. 2. In some aspects of the invention, the braking system 200 can be utilized in a hybrid vehicle with regenerative braking function (i.e., where electrical, hydraulic, or pneumatic energy storage takes place during vehicle deceleration and the stored energy may be used by the vehicle later, for example, to aid propulsion). The braking system 200 is similar in many respects to a particular type of known braking system 100 shown in FIG. 1 and similar reference numbers are used for similar parts. Despite the similarities, differences between the braking systems 100, 200 of FIGS. 1 and 2 exist which change the function and performance significantly as discussed further below.

The braking system 200 includes a plurality of independent hydraulic braking circuits 20, 24 between a brake master cylinder 14 (actuated by a user-operable brake device, such as a pedal 10a) and a plurality of wheel cylinders 38a, 38b, 68a, 68b. In the illustrated construction, the braking circuits 20, 24 provide a front/rear split and include a first circuit 20 connected with either the front or rear wheels 22a, 22b, 26a, 26b and a second circuit 24 coupled to the other of the front or rear wheels 22a, 22b, 26a, 26b. In some constructions, one or more of the wheel cylinders 38a, 38b, 68a, 68b is included in a high-retraction caliper (e.g., the wheel cylinder is configured to retract a brake pad from a corresponding brake rotor by an amount more than 0.4 mm, and in some cases 0.5 mm or more). The hydraulic braking circuits 20, 24 control the selective relief of hydraulic fluid pressure when excess input is provided by the driver so that a braking force below the traction limit is maintained. A plurality of sensors (not shown) are coupled to a controller of the braking system 200 to provide input information, typically regarding relative wheel speeds, so that the controller can control the operation of valves and flow paths within the circuits 20, 24. The braking system 200 may also be configured to provide brake force distribution, traction control, and/or electronic stability control for the vehicle since many of the same hardware components are already provided by the braking system 200.

The pedal 10a receives a driver's braking input and transmits the input to the master cylinder 14 for conveyance to the wheel cylinders 38a, 38b, 68a, 68b via the respective circuits 20, 24. Optionally, the driver's input force can be boosted by a suitable booster device such that the force received at a master cylinder input member 10b is higher than the driver's input force. With respect to FIG. 3, the master cylinder 14 includes a first or primary piston 140, which is mechanically coupled and driven by the input member 10b. The primary piston 140 operates to move and pressurize hydraulic fluid in a first chamber having a first outlet 21a to one of the two braking circuits 20, 24. The master cylinder 14 further includes a second or secondary piston 142, which is not mechanically coupled or driven by the input member 10b, but rather is a floating piston movable through hydraulic fluid pressure of the first chamber in response to movement of the primary piston 140. The secondary piston 142 operates to move and pressurize hydraulic fluid in a second chamber having a second outlet 21b. The connection between the master cylinder outlets 21a, 21b and the braking circuits 20, 24 is discussed in further detail below, and is a distinguishing feature between the braking systems 100, 200 of FIGS. 1 and 2. However, it should be noted that the terms "primary" and "secondary" are used specifically to denote the order in which the pistons 140, 142 and the corresponding chambers and outlets 21a, 21b are arranged with respect to the input member 10b of the master cylinder 14. In the example shown, the primary piston 140 has a mechanical coupling (e.g., through a booster) with the pedal 10a that receives the driver's input such that the driver receives tactile feedback of the state of hydraulic fluid pressure in the first chamber on which the primary piston 140 acts. Although shown in an actuated state in FIG. 3, it should be appreciated that the pistons 140, 142 retract when not actuated to a position in which they do not block or obstruct a compensation port 31a, 31b which fluidly couples each master cylinder chamber to the reservoir 16, which can retain a quantity of fluid at atmospheric pressure.

The first braking circuit 20 includes an input or supply line 28 from the master cylinder 14, along which a pressure sensor 32 may be provided at a branch point 33. In addition, a high-pressure switching valve 34 is coupled to the first supply line 28 via the branch point 33, and a reversing valve 36 is connected to the first supply line 28 via another branch point 35. The first braking circuit 20 can be a non-disengageable circuit in which the master cylinder outlet stemming from the driver's input is always presented to the circuit 20. In other words, when braking is being carried out in response to a driver's request, the braking force is actually provided in the first braking circuit 20 by the driver, and not by an artificial element which acts to replicate the perceived amount of braking In its normally-open state, the reversing valve 36 allows fluid to flow towards the wheel brake cylinders 38a and 38b from the supply line 28. Parallel to the reversing valve 36, a bypass line is arranged with a check valve 40 to ensure that fluid can flow in the actuation direction in the event of a malfunction of the reversing valve 36.

From the reversing valve 36, a conduit 42 is connected, which has a branch point 43, which leads to a delivery side of a pump 44 of the brake circuit 20. A branch point 45 on the suction side of the pump 44 is connected to the high pressure control valve 34 via line 46, and is further connected via a conduit 48 to a non-return valve 50. From the non-return valve 50 a line 52 extends to a wheel outlet valve 54b, which is associated with the wheel brake cylinder 38b. Via a branch point 37 a wheel brake cylinder 38a associated wheel outlet valve 54a is also connected to the line 52. Further, a storage chamber 56 can be coupled through a branching point 55 on the line 52. The line 42 leading from the reversing valve 36 extends to a wheel inlet valve 58a, which is associated with the wheel brake cylinder 38a. Via a branch point 39, the wheel brake cylinder 38b associated with wheel inlet valve 58b is likewise coupled to line 42. Parallel to wheel inlet valves 58a, 58b are arranged bypass lines with check valves 60a and 60b. The normally-open wheel inlet valves 58a, 58b are connected to the respective wheel brake cylinders 38a, 38b via respective lines 62a, 62b. The wheel outlet valves 54a, 54b are connected via branch points 64a, 64b of the respective conduits 62a, 62b. Along with the high-pressure switching valve 34, the wheel outlet valves 54a, 54b can be provided as normally-closed valves.

With respect to the second braking circuit 24, the supply line 30 leads to a separation or isolation valve 66. It should be noted that the isolation valve 66 of the second brake circuit 24 has no bypass line with a check valve. Closing the separation valve 66 thus causes a disconnection of the second brake circuit 24, in particular of the wheel cylinders 68a, 68b and the master cylinder 14. Under normal circumstances, the wheel cylinders 68a, 68b are in fluid communication with the master cylinder 14 so that braking can be carried out directly by the driver's input. However, the separation valve 66 enables the second circuit 24 to have a decoupled or disengaged mode of operation.

From the separation valve 66, a conduit 70 extends to a wheel inlet valve 72b, which is associated with the wheel brake cylinder 68b. A wheel brake cylinder 68a associated wheel inlet valve 72a is also connected via a branch point 71 to the line 70. A further pressure sensor 94 may be connected to the line 70 via branch point 71. Parallel to wheel inlet valves 72a, 72b are arranged bypass lines with check valves 74a, 74b. Furthermore, a discharge side of the pump 76 is connected via a branch point 75 to the line 70. On the delivery side of the pump 76, a PCR-valve (Pressure Control Valve) 80 is coupled via a line 78. The PCR valve 80 and the pump 76 together form a hydraulic unit which will be discussed on its function in more detail below. The PCR-valve 80 is connected via a line 82 to the brake fluid reservoir 16. Thus, additional volume of brake fluid can be introduced at the delivery side the pump 76 via the line 82 and the PCR-valve 80. Due to the available connection to the reservoir 16, the second brake circuit 24 is referred to as an open-circuit, since the amount of fluid within the circuit 24 is not absolutely set or fixed during an electronic manipulation or override. The PCR-valve 80 can be a variably adjustable valve, which is operated by a controller and assumes a normally-closed state.

Via a line 84, wheel outlet valve 86a associated with the wheel cylinder 68a is connected to the suction side of the pump 76. Via a branch point 85, a wheel outlet valve 86b associated with wheel cylinder 68b is also connected to the line 84. A further branch point 87 connects the line 84 to a first end of a conduit 88, a second end connected through a branching point 89 on the line 82. Via the line 88, the two wheel outlet valves 86a, 86b are thus connected to the reservoir 16, wherein the PCR-valve 80 and the pump 76 of second brake circuit 24 can be bridged. The wheel inlet valves 72a, 72b are connected to the respective wheel cylinders 68a, 68b via lines 90a and 90b. A branch point 92a of the wheel outlet valve 86a is connected to the line 90a. Similarly, the wheel outlet valve 86b is connected via a branch point 92b of the conduit 90b.

Similar to the first brake circuit 20, the wheel outlet valves 86a and 86b are advantageously configured as normally closed valves. The pumps 44, 76 of the two brake circuits 20 and 24 can be coupled to a common shaft, which is operated by a motor 96.

In summary it can be stated that the two wheel brake cylinders 68a and 68b can be uncoupled from the master cylinder 14 by closing the isolation valve 66. A pass-through from the master cylinder 14 to the wheel brake cylinders 68a and 68b is no longer possible with a closed separation valve 66. By contrast, the penetration of the two wheel brake cylinders 68a and 68b in accordance with a conventional modulation system is enabled when the separation valve 66 is open.

The vehicle having the braking system 200 can include a non-traditional drive element, for example, an electric drive motor that can act on the front wheels 26a, 26b to apply acceleration torque to propel the vehicle. For recuperating energy during deceleration, the drive element can operate in a power generating mode, which aids deceleration of the vehicle, and thus, reduces the need for hydraulically-actuated friction braking via the wheel cylinders, in particular, the wheel cylinders 68a, 68b of the front axle which is shared with the drive element. The first brake circuit 20, operable on an axle (e.g. rear) having no drive element, can be entirely non-disengageable and thus, always retains the coupling with the master cylinder 14. Of course, the brake system 200 is also applicable to a vehicle with a rear-wheel or four-wheel drive, as one skilled in the art can appreciate.

During regenerative braking by the drive element, the hydraulic actuation of the wheel cylinders 68a, 68b can be blocked or reduced, and can be gradually increased to blend with a regenerative braking effect as the vehicle slows down and regenerative braking is reduced in effectiveness. Hydraulic braking may also be utilized to augment regenerative braking if the maximum amount of deceleration possible from regenerative braking does not match the driver's request (e.g., in a hard stop or emergency situation). The driver's input to the brake pedal 10a is sensed by the pedal stroke sensor 12, and the application of a corresponding amount of hydraulic braking pressure in the second braking circuit 24 is controlled by the controller, taking into consideration the regenerative braking capability. The controller operates to manipulate the pressure in the second braking circuit 24 by controlling the PCR-valve 80. As regenerative braking capability decreases and eventually ceases completely, additional fluid from the reservoir 16 is pumped into the second braking circuit 24 via the line 82 in order to compensate, assuming that the braking demand is maintained or increased.

The braking system 100 of FIG. 1 is also operable to manipulate braking pressure in the second braking circuit 24 and blend hydraulic braking with regenerative braking via control of the PCR-valve 80. However, contrary to the braking system 200 of FIG. 2, the supply line 30 of the second braking circuit (or "open circuit" coupled to the fluid reservoir 16) is coupled to the secondary chamber of the master cylinder 14 via the second outlet 21b. Thus, in a situation where the separation valve 66 is open and additional fluid is introduced into the circuit 24 from the reservoir 16, the added fluid will be present in the secondary chamber of the master cylinder 14 to move the second piston 142 back toward the first piston 140. If of a substantial enough amount, this could potentially move the second piston 142 back across the compensation port 31b such that the secondary master cylinder chamber, and thus the secondary braking circuit 24, is exposed to a pressure drop by communication with the atmospheric pressure of the reservoir 16. This sudden change in pressure is undesirable from a performance standpoint. Moving the piston 142 across the compensation port 31b with high pressure in the secondary master cylinder chamber may also cause accelerated wear of the seals (not shown) on the second piston 142. In order to counteract such effects, the design must typically be such that a particular protected volume must be preserved, which occurs at the expense of the feel or responsiveness of the brake pedal 10a.

The solution of the braking system 200 of FIG. 2 is to couple the supply line 30 of the second braking circuit 24 (i.e., the "open" circuit) to the first outlet 21a and the primary chamber of the master cylinder 14. Thus, the "primary" circuit of the system 200 is the circuit 24 having the PCR-valve 80 and the "open" circuit design that can communicate directly with the reservoir 16. Meanwhile, the supply line 28 of the first braking circuit 20 is coupled to the second outlet 21b and the secondary chamber of the master cylinder 14. Thus, from a condition shown in FIG. 3 where the master cylinder input member 10b is actuated, additional fluid introduced into the second braking circuit 24 is presented to the primary chamber of the master cylinder 14, between the first and second pistons 140, 142. As shown in FIG. 4, this causes the floating second piston 142 to move farther from the first piston 140, rather than closer to it. As such, the second piston 142 is not at risk of moving to a position exposing the compensation port 31b.

As an additional benefit, the braking system 200 can be operated such that additional fluid is introduced to the primary circuit (second circuit 24) once the primary compensation port 31a is closed. This allows shorter pedal feel (i.e., better response) and can be used to compensate for vehicles having high retraction calipers, for example, which inherently require a greater amount of fluid conveyance to effect braking actuation. The design of the braking system 200 also eliminates the risk of seal wear if the driver quickly releases the brake pedal 10a during blending of hydraulic friction braking with regenerative braking.

Various features and advantages of the invention are set forth in the following claims.

What is claimed is:

1. A vehicle braking system comprising:
   a first hydraulic braking circuit including a first hydraulic wheel cylinder operable to brake a first wheel;
   a second hydraulic braking circuit including a second hydraulic wheel cylinder operable to brake a second wheel;
   a master cylinder having first and second outlets, first and second pistons associated with the first and second outlets, a fluid reservoir and a master cylinder input member provided with a mechanical coupling to drive the first piston and configured to drive the second piston only through movement of hydraulic fluid; and
   wherein the second hydraulic braking circuit is selectively disengageable from the master cylinder via a separation valve, the second hydraulic braking circuit including a line coupling a suction side of a pump with the master cylinder fluid reservoir, wherein a pressure control valve is operable to modulate the amount of fluid drawn from the master cylinder fluid reservoir by the pump,
   wherein the second hydraulic braking circuit is coupled to the first outlet of the master cylinder, and
   wherein the second hydraulic braking circuit has a first configuration in which an input force provided by a vehicle operator is applied to the first piston and carried through the first master cylinder outlet to apply a hydraulic braking force at the second hydraulic wheel cylinder, and has a second configuration in which the pump sends hydraulic fluid from the second hydraulic braking circuit directly into the master cylinder through the first outlet.

2. The vehicle braking system of claim 1, wherein the pressure control valve is a variably-adjustable controller-operated control valve operable to modulate the pump output in response to a driver braking demand applied to the mechanical coupling.

3. The vehicle braking system of claim 1, wherein the first hydraulic braking circuit is a non-disengageable braking circuit in which a driver-initiated braking input is always carried through the second master cylinder outlet to apply a hydraulic braking force at the first hydraulic wheel cylinder.

4. The vehicle braking system of claim 1, wherein at least one of the first and second hydraulic wheel cylinders is included in a high-retraction caliper.

5. The vehicle braking system of claim 1, wherein the second wheel is coupled to a drive element operable in a first mode to accelerate the second wheel to drive the vehicle and operable in a second mode to decelerate the second wheel while converting kinetic energy to stored energy.

6. The vehicle braking system of claim 5, wherein the drive element is an electric motor.

7. The vehicle braking system of claim 1, wherein the first wheel is a non-driven wheel.

8. The vehicle braking system of claim 1, wherein the second hydraulic braking circuit is coupled to the first outlet of the master cylinder through the separation valve, and the separation valve is provided in an open position in the first and second configurations of the second hydraulic braking circuit, and the separation valve further has a closed position that prevents fluid communication between the first outlet of the master cylinder and the second hydraulic braking circuit.

9. A method of actuating brakes in a vehicle brake system, the method comprising:
providing an input for receiving a driver braking request;
providing a master cylinder having a primary chamber associated with a primary piston, a secondary chamber associated with a secondary, floating piston, and a brake fluid reservoir;
providing a first hydraulic braking circuit including a hydraulic wheel cylinder configured to brake a first wheel in response to actuation of the master cylinder, wherein the first hydraulic braking circuit is coupled to receive fluid from an outlet of the master cylinder associated with the secondary chamber;
providing a second hydraulic braking circuit including a hydraulic wheel cylinder configured to brake a second wheel in response to actuation of the master cylinder, the second hydraulic braking circuit having a pump coupled with the brake fluid reservoir, wherein the second hydraulic braking circuit is coupled to receive fluid from an outlet of the master cylinder associated with the primary chamber;
in a state where the master cylinder is actuated by the input from the driver braking request, pumping fluid with the pump of the second hydraulic braking circuit from the brake fluid reservoir into the primary chamber of the master cylinder through the outlet of the master cylinder associated with the primary chamber.

10. The method of claim 9, further comprising decelerating the second wheel via a drive element operating in a regenerative mode, and wherein the pumping of the fluid to the primary chamber of the master cylinder is done during compensation for a decrease in regenerative braking capacity of the drive element.

11. The method of claim 9, wherein the pumping of the fluid to the primary chamber of the master cylinder is done to sharpen the response characteristic of a brake member which receives the driver braking request.

12. The method of claim 9, further comprising modulating the pumping effect with a variable pressure control valve.

13. The method of claim 12, wherein modulating the pumping effect includes modulating the pumping effect with a variably-adjustable controller-operated pressure control valve in response to the driver braking request.

* * * * *